Oct. 9, 1951     H. J. HADFIELD     2,570,942
AUTOMATIC PINTLE OILER
Filed Oct. 13, 1947
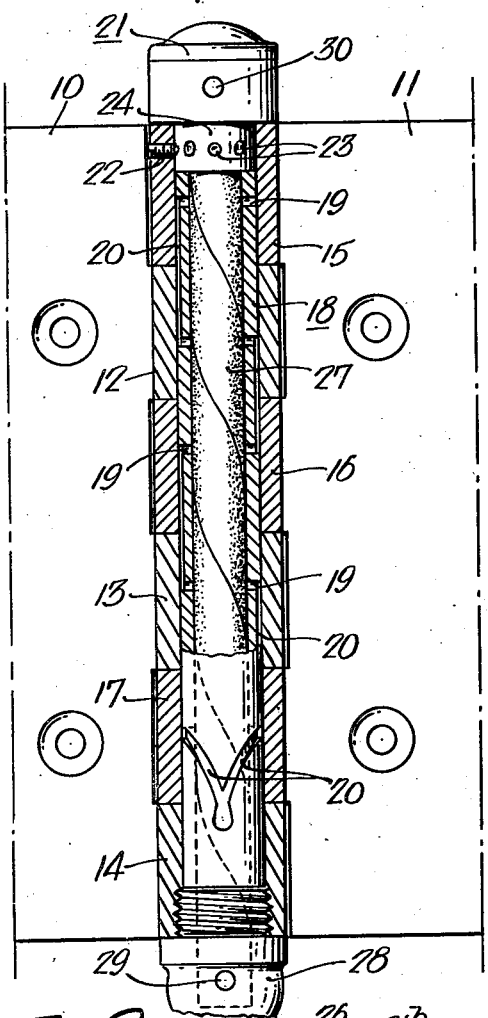
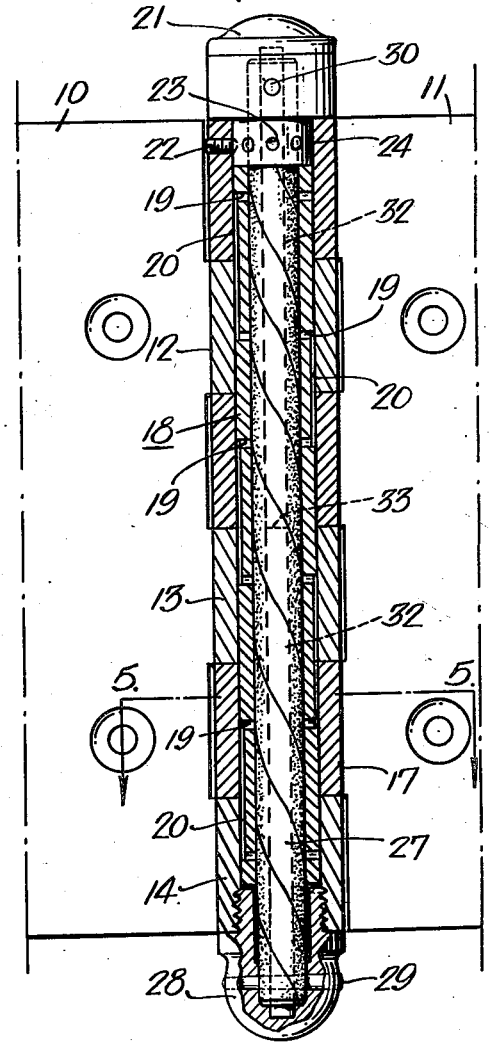
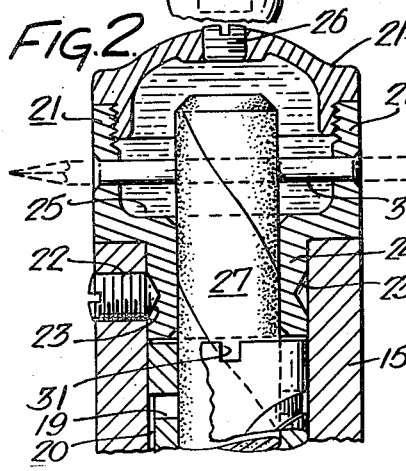
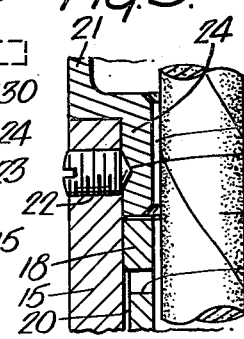
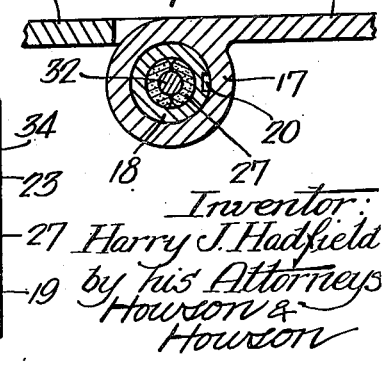
Inventor:
Harry J. Hadfield
by his Attorneys
Howson &
Howson Patented Oct. 9, 1951

2,570,942

UNITED STATES PATENT OFFICE 2,570,942

AUTOMATIC PINTLE OILER

Harry J. Hadfield, Philadelphia, Pa.

Application October 13, 1947, Serial No. 779,440

9 Claims. (Cl. 16—161)

This invention relates to means for lubricating the fulcrums or pintles of relatively oscillating structures such as hinges of all kinds, as well as rudders, pivot studs, or any other structure where one element is swingably mounted on another element and requires lubrication for the pivotal connection between the relatively rotatable structures.

A primary object of the invention is to provide in a hinge-like device a hollow pivot pin or pintle which is normally filled by a twistable element having opposite ends attached to the movable elements of the structure. The hollow pintle is provided with lubricant passages permitting the flow of lubricant from the bore of the pintle to the outer surface thereof. When the hinge plates are rotated with respect to each other, the twistable element contracts radially, thereby permitting lubricant to flow into the bore of the pintle and out of the passages to lubricate the outer surface of the pintle.

The invention also includes the provision of a lubricant reservoir for supplying lubricant to the bore of the pintle and also contemplates the use of a central rod around which the twistable element may be wound.

Further objects will be apparent from the specification and drawings in which:

Fig. 1 is a front elevation, partly sectioned, of the invention as applied to a standard butt hinge;

Fig. 2 is an enlarged sectional detail of the top portion of the hinge structure showing the lubricant reservoir and means for securing the twistable element;

Fig. 3 is a fragmentary sectional detail of the structure of Fig. 2 showing the radial contraction of the twistable element upon relative rotation of the hinge plates;

Fig. 4 is a modified form of the invention having a centrally located pin member in the pintle; and Fig. 5 is a section taken along the lines 5—5 of Fig. 4.

The invention comprises essentially the provision of a lubricant reservoir at one end of a hinge structure adapted to supply lubricant to a hollow hinge pintle containing a twistable element which is pinned at each end to opposite hinge plates. This twistable element is preferably made of rawhide having a predetermined twist imparted thereto upon assembly and automatically valves lubricant both into and out of the pintle bore. The diameter of the rawhide element is such that it completely fills the bore of the pintle to prevent any flow of lubricant from the reservoir through the bore. When the hinge plates are moved with respect to each other, the rawhide becomes more tightly twisted, thereby contracting radially and permitting lubricant to flow through the pintle bore from the reservoir. In large structures such as vaults or rudders, it may be desirable to provide an annular space for the rawhide and for this purpose, I utilize a spacing pin around which the rawhide is twisted before insertion.

Referring now more particularly to the drawings, Fig. 1 illustrates a hinge having standard relatively movable hinge plates 10 and 11. Hinge plate 10 has a series of spaced eyes 12, 13 and 14 which mate with spaced eyes 15, 16 and 17 on hinge plate 11. The extreme eyes 14 and 15 are attached to opposite hinge plates for a purpose to be more fully described hereinafter.

A hollow pintle is enclosed within the eyes 12—17 and serves as a pivotal axis for the plates in the customary manner. Pintle 18 terminates substantially within the two outermost eyes 14 and 15 as shown in Fig. 1, and is provided with radial lubricant passages 19 which are joined by external grooves 20. A cap 21 is adjustably secured in eye 15 by means of a set-screw 22 adapted to lock cap 21 in any desired radial position when the set-screw is turned into one of a plurality of depressions 23 in the annular shoulder 24 of cap 21. The upper portion of cap 21 is hollow to provide an oil reservoir 25 which may be replenished by removing the filler plug 26, and if desired, cap 21 may be made in two parts 21a and 21b as shown in Fig. 2.

The twistable element 27 is formed from a single or double rawhide thong twisted until the edges of the thong form a substantially cylindrical outer surface. If desired, the rawhide member may be trimmed when in the twisted condition, in order to provide a smooth, cylindrical surface. In assembly, rawhide element 27 is inserted in the bore of pintle 18 until it extends into lower cap 28 to which it is securely pinned at 29. The opposite end of rawhide element 27 extends through the bore of shoulder 24 into reservoir 25. This end is likewise pinned to cap 21 by means of a pointed pin 30 adapted to be driven through the cap to the position shown in dotted lines in Fig. 2. Opposite ends of pin 30 are then cut off and the pin riveted securely to the cap.

The ends of pintle 18 may be provided with grooved oil passages 31 which operate in the same manner as passages 19. Where the bore of pintle 18 is of such a size that the complete filling of the bore would require an excessive amount of rawhide, I provide a pair of spacer pins or rods 32, 32 (Fig. 4) which are supported and positioned by means of pins 29 and 30 and which abut each other at 33.

In assembly, element 27 which may be made of rawhide or any strong twistable material having properties similar to leather, is adjusted by means of turning cap 21 so that in the normal inoperative position of hinge plates 10 and 11, the bore of pintle 18 as well as the bore of shoulder 24 on cap 21, is completely filled by the element 27. In this position, no flow of lubricant within the bore of pintle 18 or from reservoir 25 takes place.

Upon relative movement of plates 10 and 11 with respect to each other, the element 27 is twisted in the same direction as the pre-formed twist, thereby radially contracting it to provide an annular passage 34 (Fig. 3) for the flow of lubricant from reservoir 25 to the bore of pintle 18 and/or out through passages 19, 31. It will be understood that the element 27 does not necessarily have to be pre-twisted so long as it be capable of radial contraction upon relative movement of the hinge plates. However, where a pre-twisted element is employed, the amount and direction of the twist is such that relative movement of the hinge plates further twists the element in the same direction, thereby contracting it radially.

Since cap 28 is anchored in eye 14 of plate 10, and cap 21 is anchored in eye 15 of plate 11, the contraction of element 27 occurs only when the hinge is operated so that in the normally inoperative position no lubricant can flow from reservoir 25. It will be understood that cap 28 may be formed integrally with eye 14 or may be secured to it in any convenient way such as pressing, soldering, brazing, etc. The automatic feature of the construction provides long life and permits much greater periods between times when it is necessary to replenish the lubricant in the reservoir. The construction is likewise simple and will not get out of order. The adjustable feature of the cap adds to the longevity of the device since the pre-formed twist of thong 27 may be set in accordance with the frequency of operation as well as any wear which may eventually take place.

I claim:

1. A device of the character described, comprising a first rotatable structure, a second rotatable structure, a hollow pintle connecting said structures, and a radially contractible element normally filling the bore of said pintle, opposite ends of said contractible element being secured respectively to said structures whereby relative rotation of the structures on the pintle produces circumaxial distortion and contraction, and at least one lubricant passage connecting the bore of the pintle and the outer surface of said pintle, said passage being normally closed by the contractible element.

2. Apparatus in accordance with claim 1, in which the contractible element is comprised of at least one length of rawhide.

3. A device of the character described, comprising a first rotatable structure, a second rotatable structure, a hollow pintle connecting said structures, a twistable radially contractible element normally filling the bore of said pintle, means for attaching one end of said twistable element to one of said structures, and means for attaching the other end of said twistable element to the other of said structures whereby relative rotation of the structures on the pintle produces circumaxial distortion and contraction, and at least one lubricant passage connecting the bore of the pintle and the outer surface of said pintle, said passage being normally closed by the contractible element.

4. A lubricating device in accordance with claim 3, in which the twistable element is formed of rawhide.

5. A device of the character described, comprising a first rotatable structure, a second rotatable structure, a hollow pintle connecting said structures, a cap associated with one of said rotatable structures and having a lubricant reservoir, and a radially contractible element extending axially through said pintle and into said reservoir to act as a valve for controlling the flow of lubricant from the reservoir to the bore of said hollow pintle, the opposite ends of the element being respectively secured to said structures for effecting circumaxial contraction of said element upon relative rotation of said structures about the axis of said pintle.

6. Apparatus in accordance with claim 5 having at least one rod in the bore of said pintle about which rod the contractible element is twisted.

7. In a hinge construction, a pair of hinge plates having a plurality of hinge eyes attached thereto, the outermost eyes being on opposite plates, a hollow hinge pintle axially connecting the eyes and terminating within the outermost eyes, a plurality of lubricant passages connecting the outside of the pintle with the bore of the pintle, a pintle cap adjustably mounted in one of the outermost eyes, means for effecting rotatable adjustment between the cap and the eye, a lubricant reservoir in the cap, a second cap non-rotatably secured to the other outermost hinge eye, and a radially contractible element extending through the bore of the pintle and non-rotatably secured in each cap.

8. A hinge construction in accordance with claim 7, in which the twistable contractible element is wrapped around a pair of axially aligned rods attached in each cap respectively.

9. A device of the character described, comprising a first rotatable structure, a second rotatable structure, a hollow pintle connecting said structures, and a radially contractible element normally filling the bore of said pintle, opposite ends of said contractible element being secured respectively to said structures whereby relative rotation of the structures on the pintle produces circumaxial distortion and contraction, and a plurality of radial lubricant passages connecting the bore of the pintle and the outer surface of said pintle, the said passages being normally closed by the contractible element.

HARRY J. HADFIELD.

REFERENCES CITED

The following references are of record in the file of this patent:

UNITED STATES PATENTS

| Number | Name | Date |
|---|---|---|
| 627,730 | Haferkorn | June 27, 1899 |
| 1,139,822 | Sundh | May 18, 1915 |
| 2,255,529 | May | Sept. 9, 1941 |

FOREIGN PATENTS

| Number | Country | Date |
|---|---|---|
| 13,332 | Norway | Oct. 3, 1904 |
| 183,492 | Germany | Mar. 18, 1907 |